United States Patent [19]

Orecharova et al.

[11] Patent Number: 5,612,402

[45] Date of Patent: Mar. 18, 1997

[54] CURABLE POLYSULFIDE POLYMER COMPOSITION

[76] Inventors: Liliana S. Orecharova, 19, Hristo Belchev Street, Sofia 1000; Emil S. Vassev, 520 Block, B Entr., Lulin 501 Street, Sofia; Rossislav L. Orecharov; Petko L. Orecharov, both of 19, Hristo Belchev Street, Sofia 1000, all of Bulgaria

[21] Appl. No.: 374,631

[22] PCT Filed: Apr. 29, 1994

[86] PCT No.: PCT/BG94/00005

§ 371 Date: Jan. 23, 1995

§ 102(e) Date: Jan. 23, 1995

[87] PCT Pub. No.: WO94/28072

PCT Pub. Date: Dec. 8, 1994

[30] Foreign Application Priority Data

May 28, 1993 [BG] Bulgaria ............................... 96953

[51] Int. Cl.$^6$ ......................................................... C08K 3/10
[52] U.S. Cl. ........................ 524/437; 524/500; 524/609; 525/350; 528/374; 528/375; 528/376; 528/377
[58] Field of Search .................... 524/609, 424, 524/500, 437; 525/350; 528/374, 375, 376, 377

[56] References Cited

U.S. PATENT DOCUMENTS

| | | | |
|---|---|---|---|
| 3,225,017 | 12/1965 | Seegman et al. | |
| 3,951,898 | 4/1976 | Paul | 524/507 |
| 4,017,554 | 4/1977 | Villa | 528/375 |
| 4,263,078 | 4/1981 | Millen et al. | 528/374 |
| 4,314,920 | 2/1982 | Millen | 528/388 |
| 4,608,433 | 8/1986 | Meyer et al. | 528/388 |
| 4,623,711 | 11/1986 | Morris et al. | 528/374 |
| 5,371,111 | 12/1994 | Unger et al. | 528/375 |
| 5,393,861 | 2/1995 | Sakae et al. | 528/374 |

OTHER PUBLICATIONS

Aliphatic Polysulfides, Monograph of an Elastomer, Heinz Lucke (1994) pp. 22–35, 39, 44, 45, 48–63 and 77.

T.M. Rees, N. Thompson, and A. Wilford, The Modern Approch to Modifying Epoxy Resins Using Liquid Polysulfides (Morton International, Ltd, Coventry, U.K. (no date).

*Primary Examiner*—Mark D. Sweet
*Attorney, Agent, or Firm*—Herbert Dubno; Jonathan Myers

[57] ABSTRACT

The invention relates to a curable polysulfide composition, which has an application in making a preserving coating, and an insulator in the field of road construction, house building, etc. The target of the invention is to obtain a stable polysulfide curable composition for which the cure rate and the cure velocity are independent of the surrounds, to allow the obtaining of vulcanized material with high grade of technical and ecological parameters, avoiding the typical unpleasant smell of mercaptane polysulfides and the toxicity of the curing agents, additives and fillers. The problems is solved using the following curable polysulfide composition: polysulfide polymer and/or copolymer containing up to 1 mol/kg SH groups, with molecular weight from 2,000 to 200,000, polysulfide degree from 2.2 to 4.0, ramification rate up to 4 mol percent and degree of polymerization of 20 to 500 in an amount of 90 to 110 pbw; modifier up to 75 pbw; curing agent from 0.2 to 20 pbw; polar solvent or reagent u to 25 pbw; acceptor from 5 to 50 pbw; fillers and other additives up to 150 pbw.

16 Claims, No Drawings

CURABLE POLYSULFIDE POLYMER COMPOSITION

FIELD OF THE INVENTION

The invention relates to a curable polysulfide composition suitable for use as an insulator and filler (gap compensator) in road and house building and as a means of binding in automobile and airplane construction, hermetical sealing, impregnating porous materials and preparing corrosion, hydro and thermo resistant coatings and caulkings.

BACKGROUND OF THE INVENTION

A composition is known that is self-curing under atmospheric conditions after application on a surface. This mixture comprises a liquid polysulfide mercaptan group-terminated polymer (molecular weight 4000, cross-linking 0.5%, mercaptan groups 0.53 mol/kg), a peroxide of an alkali or alkaline earth metal as a watersoluble curing agent, an alkaline or alkaline earth oxide, hydroxide or salt of a weak acid as a water-soluble activating agent as well as other modifying additives and fillers. See U.S. Pat. No. 3,225,017.

Drawbacks of the composition: the curing agents are highly inflammable and unstable peroxide compounds; the curing rate is unpredictable since it depends directly on the moisture present in the air; the presence of mercapto groups in the polymer imparts an unpleasant smell to the composition and may provoke cyclic polycondensation or preliminary curing during storage.

A curable composition is known to those skilled in the art in U.S. Pat. No. 3,951,898 as well as a method of curing this composition, which consists in mixing at ambiant temperature: (a) polysulfide polymeric latex ZW-679 (10–20 pbw) which represents an aqueous dispersion containing about 60% of a solid phase linear polymer, with a molecular weight of 100 000 and the formula.

$$-(R-S_x)_n-,$$

wherein $S_x$ is a polysulfide linkage, R is oxahydrocarbon, n is about 500; (b) a polyurethane prepolymer (15–30% of the total amount of the mixture and 4–10% isocyanate groups; (c) fillers; (d) plasticizers, (e) a latex stabilizer and (f) an antisponging agent.

A disadvantage of this composition is that no real curing (cross-linking) of the polysulfide polymer occurs because the composition contains neither branches along the linear chain nor mercapto groups by means of which curing or cocuring with the polyurethane copolymer would occur. Besides, the composition contains no curing agent. In fact the mixture hardens as a result of hydrolysis of the isocyanate groups of the polyurethane under the effect of the water of the latex dispersion, while the polysulfide polymer densifies by coalescence without cross-linking and, as a result, a series of the properties of the cured product are not good enough.

A polysulfide polymer is known from U.S. Pat. No. 4,608,433 which has a molecular weight of 3000 to 100 000 and the formula $$Y-[S_nR]_mS_n-Y$$
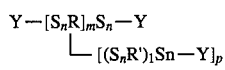

wherein R and R' are independent polyvalent organic radicals, Y is a terminating inert monovalent substituent, m is a positive integer n ranges from 2 to 8, and p and l are equal to zero or are positive integers.

The drawback of this polysulfide polymer is that it is used as a plasticizer only.

OBJECT OF THE INVENTION

The object of the invention is to obtain a stable polysulfide curable composition for which the cure rate and the cure velocity are independent of the moisture content of the surroundings and the resulting cured composition has high technical properties, including in case with the polysulfide polymers contain no mercapto groups, a wide sphere of application, and which is ecologically and economically favorable.

This problem is solved using the following curable polysulfide composition:

A polysulfide polymer and/or copolymer having up to 1 mol/kg SH groups, a molecular weight of 2000 to 200 000, a sulfur rank of 2.20 to 4.00, cross-linking ranging from 0 to 4 mol %, a degree of polymerisation of 20 to 500 in an amount of 90 to 110 pwb, and the formula

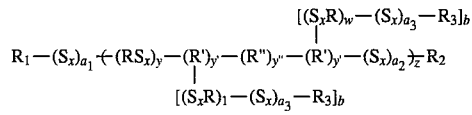

wherein $S_x$ is a divalent polysulfide or monosulfide radical;

x is an integer ranging from 1 to 6;

$a_1$, $a_2$ and $a_3$ are the same or different and have values of 0 to 1;

y denotes the number of monomer units and the number of polysulfide bonds in the polysulfide segment of a given polysulfide copolymer with values varying between 1 and 10;

y' is the number of monomer links connecting the polysulfide and nonsulfide segments of a given copolymer and has a value of 0 or 1;

y" stands for the number of monomer links in the nonsulfide polymeric segment and has a value of 0 to 5;

z is the degree of polymerization of the polysulfide;

w has values of 0 to 5;

b denotes the number of polysulfide branches of the linear polymer chain or the copolymer, respectively, formed by the binding and chain branching polyvalent monomer, and is equal to R' minus 2;

R is a saturated divalent normal or isoalkyl, aralkyl or aryl radical, wherein the alkyl radical or the alkyl part of the aralkyl radical is a hydrocarbon, oxahydrocarbon or thiahydrocarbon, and the group being illustrated more precisely by the following formulae: $-C_nH_{2n}-$; $-C_6H_4-$; $-C_nH_{2n}OC_nH_{2n}-$; $-C_nH_{2n}SC_nH_{2n}-$; $-C_nH_{2n}C_6H_4C_nH_{2n}-$; $-C_6H_4OC_6H_4-$; $-C_6H_4OC_nH_{2n}-$; $-C_nH_{2n}C_6H_4OC_6H_4C_nH_{2n}-$; $-C_6H_4O/C_mH_{2m}O/_fC_6H_4-$; $-C_6H_4C_nH_{2n}OC_nH_{2n}C_6H_4-$; $-C_nH_{2n}O/C_mH_{2m}O/_fC_nH_{2n}-$; $-C_nH_{2n}OC_6H_4OC_nH_{2n}-$;

$$-CH_2OCH_2\underset{CH_3}{\overset{CH_3}{C}}CH_2OCH_2-;\ -CH_2-\underset{CH_3}{\overset{CH_3}{C_6H_3}}-CH_2-;$$

-continued $-CH_2-CH-CH_2-$;
       |
       $C_6H_5$

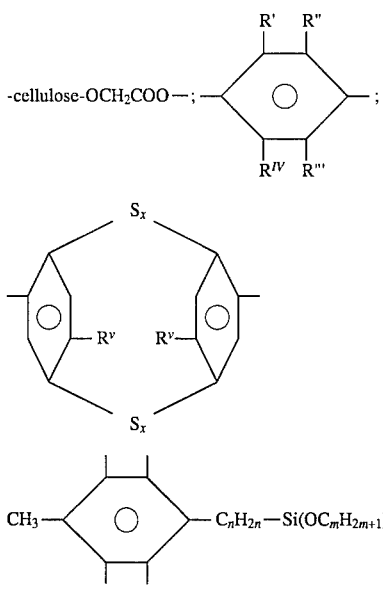

wherein
  n ranges from 1 to 24;
  m ranges from 1 to 5;
  f ranges from 1 to 10;
  R', R", R''' and $R^{IV}$ are the same or different saturated monovalent hydrocarbon, oxahydrocarbon or thiahydrocarbon radical;
  R' is a saturated monovalent alkyl radical of the kind $-SC_mH_{2m+1}$ or $-OC_mH_{2m+1}-$;
  $S_x'$ is a polysulfide linkage;
  x' ranges from 3 to 5;
  $R_1$, $R_2$ and $R_3$ are the same or different terminals representing normal or iso-alkyl, aryl or aralkyl radicals or groups of the type: $-SH$; $-SSH$; $-OH$; $-CHO$;
  $-C_nH_{2n+1}$; $-C_nH_{2n}C_6H_5$; $-C_nH_{2n}OC_6H_5$;
  $-C_nH_{2n}OC_nH_{2n+1}$; $-C_6H_5$; $-C_{10}H_7$;
  $-C_6H_4OC_6H_5$; $-C_6H_4SC_6H_5$; $-OC_nH_{2n+1}$;
  $-OC_6H_5$; $-OC_7H_{10}$; $-OC_6H_4OC_nH_{2n+1}$;
  $-C_nH_{2n}OH$; $-C_6H_4OH$; $-OC_6H_4C_6H_4OH$;
  $-OC_nH_{2n}OH$;

$-O(C_2NH_{2n})_m$; $-NHC_6H_5$; 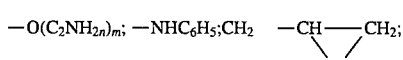

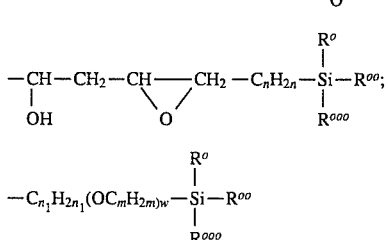

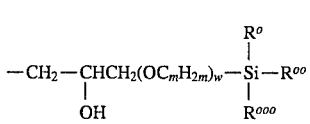

wherein
  $R^o$, $R^{oo}$ and $R^{ooo}$ are the same or different saturated monovalent radicals of the groups; $-OC_mH_{2m+1}$; $-OC_mH_{2m}C_6H_5$ or $-C_mH_{2m+1}$;
  $n_1$ has values from 1 to 10;
  m has values from 1 to 5
  w has values from 1 to 10;
  $R^{IV}$ is a polyvalent radical with a weight up to 10% from the molecular weight of the said polymer or copolymer and is a radical of a polyfunctional compound selected from the group:

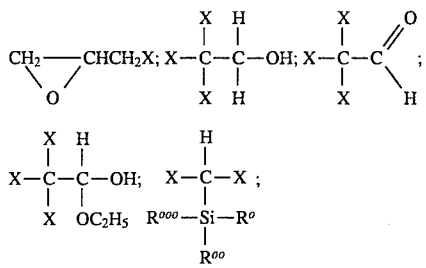

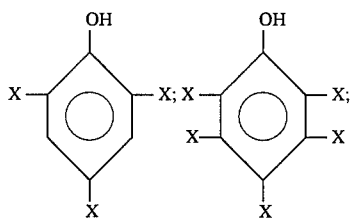

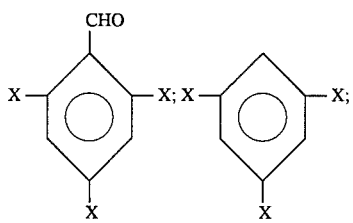

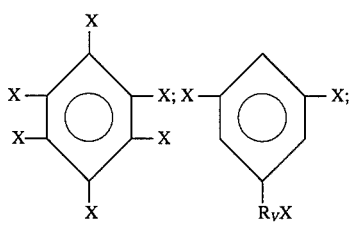

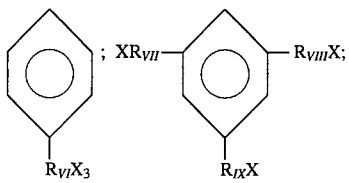

wherein
  X is a halogen atom;
  $R_I$, $R_{II}$ and $R_{III}$ are hydrocarbon, oxahydrocarbon, thiahydrocarbon or aralkyl radicals;
  $R_{IV}$ is selected from the group consisting of alkyl, aryl, and aralkyl radicals or is a carbon atom;
  $R_V$, $R_{VI}$, $R_{VII}$, $R_{VIII}$ and $R_{IX}$ are alkyl radicals representing a hydrocarbon or oxahydrocarbon;

$R^o$, $R^{oo}$ and $R^{ooo}$ are the same or different monovalent radicals of the group: $-OC_mH_{2m+1}$; $-C_nH_{2n}C_6H_5$; $-OC_6H_5$, wherein "m" ranges from 1 to 5 and ,"n" ranges from 1 to 10

R" represents a saturated divalent radical free of SH, SSH and $S_x$ groups and is selected from the group:

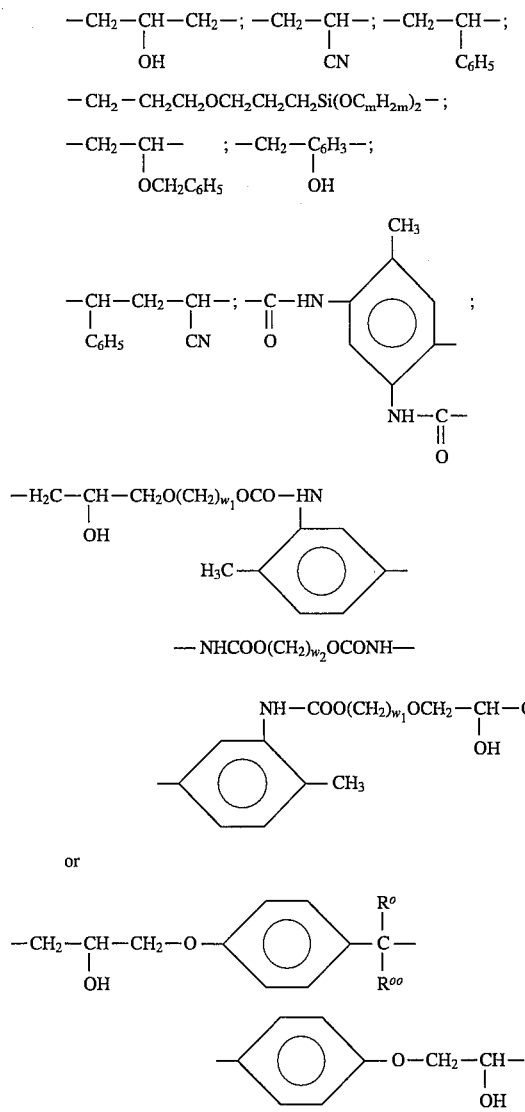

wherein
- $w_1$ has values from 4 to 6;
- $w_2$ has values from 4 to 6; and
- $R^o$ and $R^{oo}$ are the same or different having the corresponding meaning of $R^o$, $R^{oo}$, $R^{ooo}$ included in R, or they are hydrogen atoms or alkyl radicals.

The composition contains up to 75 pbw modifiers. A low-molecular weight polysulfides polymer free of SH and SSH groups with a molecular weight of up to 2000, a degree of polymerisation of 2 to 10, and a sulfur rank of 2.5 to 5 is used as modifier and plasticizer. It is illustrated by the formula:

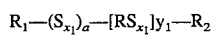

wherein
$S_{x_1}$ is a polysulfide linkage $x_1$ has values ranging from 2 to 6

$y_1$ has values from 3 to 10 a is from 0 to 1

R, $R_1$ and $R_2$ have the meanings given for the main polymer and/or copolymer excepting —SH and —SSH.

Other modifiers used are polysulfide dimers of the kind

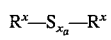

wherein
$S_{x_a}$ is a polysulfide radical;
$x_a$ has values between 3 and 6;
$R^x$ is a saturated monovalent radical free of SH and SSH groups and is selected from the group

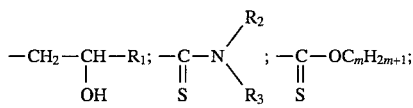

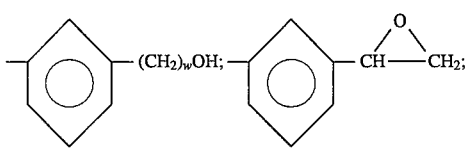

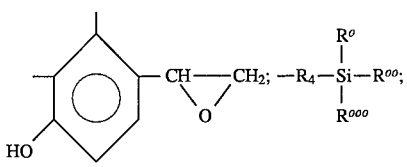

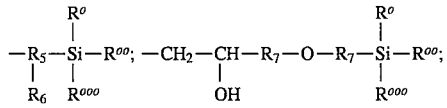

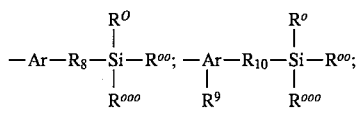

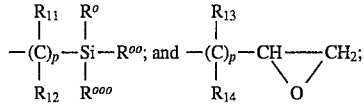

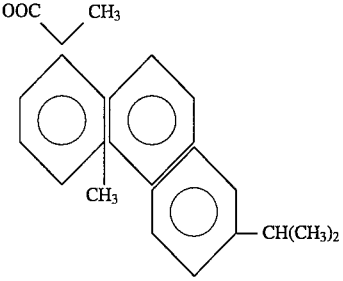

wherein
$R_1^x$ to $R_{14}^x$ denote alkyl or aralkyl radicals containing from 1 to 15 carbon atoms;

$R_1^o$, $R_1^{oo}$ and $R_1^{ooo}$ are the same or different saturated monovalent radicals of the kind $-OC_mH_{2m+1}$; $-OC_mH_{2m}C_6H_5$; $-C_6H_5$; $-C_mH_{2m+1}$;

wherein
- m has values from 1 to 5
- w has values of 1 to 5
- p has values of 1 to 5 and
- Ar is an aryl radical Or R belong to the group of benzothiazoles or another modifying group.

Another possible modifier is a polysulfide monomer with the formula

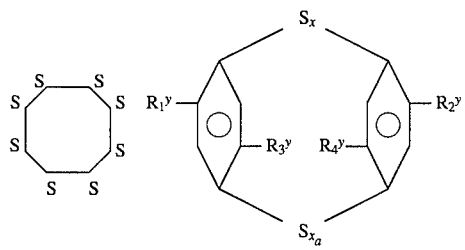

wherein
- S is a sulfur atom
- $S_{x_a}$ is a polysulfite bond
- $x_a$ is an integer with values of 3 to 6
- $R_1^y$, $R_2^y$, $R_3^y$, and $R_4^y$ are the same or different modifying given above or are other modifying radicals free of SH and SSH groups.

The modifying additive may also be hydrolyzable polyurethane/prepolymer containing free isocyanic groups (5–40 mol %) or another hydrolyzable polymer or a nonsulfide polymer able to cocure with the polysulfides of the composition or another nonsulfide copolymer able to copolymerize with a mercapto group-terminated polymer of the composition.

The composition also contains 0.2 to 20 pbw of a curing agent comprising, or creating, under the effect of the polar agent, active ions or active molecular centers capable of curing the polysulfite components, being consumed once or regenerated many times.

The curing agent used is a chemical element or a chemical compound which interacts and/or is dissolved in a liquid or gaseous (at the curing temperature) polar reagent and/or polar solvent, and is selected from the group: gaseous substances such as $NH_3$, CO, COS, $O_2$, diborane, hydrogen selenide, methylamine, trimethylamine, etc; metal powders such as Li, Na, K, Ba, Cd, Mn, Pb, Sr, Zn etc; hydroxides such as $NH_2OH$, $NH_4OH$ as well as the hydroxides of Li, K, Na, Ba, Ca, Be, Zn, etc; oxides of Li, K, Na, Ba, Ca, B, Pa, Sb, Cr, Mn, Sn, Te, etc; Salts of metal acids (double oxides) such as antimonates, bismuthates, borates, vanadates, tungstates, permanganates, molybdates, plumbates, selenides, selenates, silicates, ferrates, tellurates, chromates, bichromates, zincates etc; monosulfates of ammonia, Na, K, Li, Ba, Ca, Mg, Si, B, Ti etc; metal pyrophosphates; metal amides; metal alcoholates; metal mercaptides and polymercaptides; alkaline catholytes; alkalized chloro paraffins, salts of saturated fatty and aromatic mono and dicarboxylic acids as well as of the methylbenzoic, phenylacetic, terephthalic acids; hydrazine and organic hydrazines; polymeric metal alcoholates and carboxylates, metal-containing hydrocarbons etc; organic amides and amines including benzoxazoles, benzthiazoles, benztriazoles and alkylthiurams or the curing agent is insoluble in the given polar solvent and is a metal powder, oxide, hydroxide, or oxyhydroxide whose metal has a higher chemical affinity to sulfur than to oxygen, or the curing agent is a polar liquid or a polar melt or an unsaturated low-molecular weight organic compound.

The composition also contains up to 25 pbw of a polar reagent and/or a polar solvent which, at ambient temperature, is mainly water, alcohol, a liquid organic acid or another polar reagent and/or solvent and at elevated curing temperature it is mainly a saturated higher fatty acid or another polar organic reagent and/or polar solvent which is liquid at this temperature.

The composition also contains 5 to 50 pbw of an acceptor which can be: an acceptor of a gaseous polar reagent and/or a solvent (mostly acceptor of moisture) and represents an organic liquid infinitely soluble in the polar solvent or the said acceptor is a highly hygroscopic powdery potential curing agent: BaO, $Na_2O$, Na, etc; an acceptor of sulfur, containing mainly Sb, Be, Bi, V, W, Fe, Hg, Sn, Co, Mn, Cu, Mo, Ni, Pb, Zn etc; an acceptor of $CO_2$: mainly $Mg(OH)_2$ and $Zn(OH)_2$; an acceptor of acid anions: e.g., mainly MgO and ZnO for $SiO_3^{2-}$.

Up to 150 pbw of fillers (known special-purpose additives and inert fillers) and with some compositions, also gasforming fillers and/or "active" fillers such as soot, molecular sieves, zeolites, etc. are added.

THE INVENTION HAS THE FOLLOWING ADVANTAGES

1. The composition allows curing polysulfide polymers having no mercaptan content.
2. The hygiene of the working conditions is improved during both the preparation and the application of the composition.
3. The composition permits the introduction of considerable amounts of water, which plays a multifunctional role: a dispersing agent for hygroscopic components (e.g. ZnO); a solvent and ionizer of the curing agent; a means for decreasing the viscosity of the composition, improving its homogenization and decreasing the amount of attracted air (i.e. the air bubbles in the cured material). The water also takes part as a structural water in the cured composition, saturating the free valencies liberated during the curing, and this reduces or completely eliminates the volume swell of the cured material when placed in water or another solvent, i.e. the chemical stability and the dimensional precision of the cured composition increase, while its cost price decreases.
4. The curing agents are not inflammable and unstable peroxides. Besides, their large number allows the best choice for each composition and enlarges the application field of the compositions.
5. The modifiers used, some of which play also the role of plasticizers, copolymerize or are co-cured along with the main polysulfide polymer or copolymer, as a result of which they can not be washed off and do not evaporate.
6. When a one-pack curable composition is prepared for a gaseous curing agent, no preliminary drying of the components and no evacuation or hermetic closing of the composition in the vessels, where it will be stored, is needed.

The whole necessary water amount is introduced previously and the cure rate and cure velocity become independent of the amount of moisture in the surroundings.

The following examples are intended to be merely illustrative of the present invention and not in limitation thereof.

EXAMPLE 1

The one-pack prepared composition consists of:

100 pbw of an epoxy-polysulfide polymer having epoxy-terminated groups, an average sulfur rank of 2.2, with no cross-linking and the average formula:

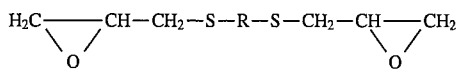

wherein

R=—/CH$_2$CH$_2$OCH$_2$S$_x$/$_6$CH$_2$CH$_2$OCH$_2$CH$_2$—, x has values of 2, 3 or 4

1 pbw of powdered sodium or 2 pbw of powdered sodium hydroxid as an acceptor of moisture and dormant curing agent 10 pbw of zinc oxide as an acceptor of sulfur and filler 5 pbw of glycerol as an acceptor of atmospheric moisture, inhibitor of curing and structure-forming agent 5 pbw of TiO$_2$ as a neutralizing agent (acceptor of excess of alkalinity).

The composition is cured upon reaction with atmospheric moisture.

EXAMPLE 2

A curable composition consisting of:

100 pbw of a liquid polysulfide polymer (LP-32C) whose SH groups have been blocked by pre-treatment with HS—CH$_2$CH$_2$—OH 15 pbw of water as a solvent of the curing agent and a structure forming agent.

12 pbw zinc oxide as acceptor of sulfur

The mixture is homogenized well. At first aqueous suspension of the zinc oxide is prepared and added to the liquid polymer. The curing proceeds under the effect of gaseous ammonia, the mixture being applied on the corresponding surface and a negligible amount of ammonia being passed over it.

Curing proceeds from the outside to the inside and the curing agent is regenerated many times.

EXAMPLE 3

A composition just like in example 2. The material to be impregnated by placing it for 10–15 min. in a 15–20% ammonia solution. After squeezing the material is coated with the impregnating mixture and the curing process takes place from the inside to the outside.

EXAMPLE 4

A two-pack mixture consisting of:
Pack I

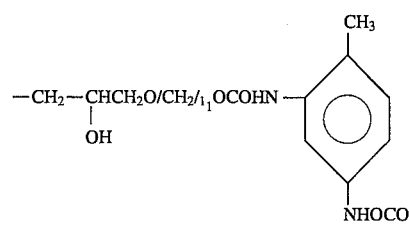

100 pbw of a polysulfide (LP-32C)
10 pbw of zinc oxide as acceptor of sulfur 5 pbw of titania as acceptor of superfluous alkalinity 10 pbw of lamp black, a reinforcing filler containing adsorbed CO and O$_2$.

20 pbw of an inert filler

This mixture needs no preliminary drying of the components and noo storage in hermetical containers.

Pack II 15 pbw of an aqueous solution and 3 pbw Na$_2$ZnO$_2$ or 1 pbw NaOH oro catholyte with 0.2 pbw NaOH The composition solidifies very quickly after mixing the two packs.

EXAMPLE 5

A two-pack composition consisting of:
Pack I
100 pbw of a polysulfide polymer (LP-541)
30 pbw of amorphous SiO$_2$, a filler and acceptor of alkalinity
Pack II
10 pbw Ca(OH)$_2$, a regenerizing curing agent
10 pbw zinc oxide, acceptor of sulfur
15 pbw of water, a polar solvent
The two packs are mixed before use.

EXAMPLE 6

A two-pack composition coonsisting of:
Pack I
100 pbw of a polysulfide polymer (latex) prepared in known manner and having the formula

wherein

R=CH$_2$—CH$_2$—O—CH$_2$—O—CH$_2$—CH$_2$

S$_x$ is a polysulfide linkage x is 2,3 or 4 n is about 500 with a molecular weight of 100 000, a sulfur rank of 2.3 and cross linking 0% 30 pbw water remained after washing and filtering the latex 10 pbw of sodium polyacrylate, a latex stabilizer and a weak curing agent and cocuring modifier 10 pbw of a filler (lamp black and/or amorphous SiO$_2$)

Pack II 50 pbw of a polyurethane prepolymer containing 8% free NCO groups and solidifying during hydrolysis; the said copolymer is a commercially available product obtained from polyether-polyol and organic diisocyanate and has the following approximate formula:

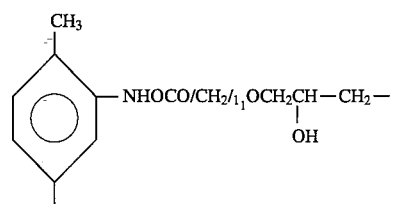

5 pbw Mg(OH)$_2$, an acceptor of CO$_2$ evolving during hydrolysis of polyurethane 7 pbw $Zn(MnO_4)_2 \cdot 6H_2O$, an easily water-soluble curing agent for the polysulfide polymer 5 pbw $Ca(MnO_4)_2 \cdot 5H_2O$, a curing agent for the polysulfide The two packs are mixed before use.

EXAMPLE 7

A one-pack curable mixture consisting of:

100 pbw of a polysulfide polymer, LP-31 being used for the example 10 pbw of zinc oxide, an acceptor of sulfur 10 pbw $(NH_4)_3[Fe(C_2O_4)/_3] \cdot 3H_2O$, a curing and gas-forming agent, easily water-soluble, decomposing at 165° C.

5 pbw

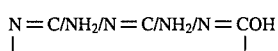

(ammelite), a curing and gas-forming agent 5 pbw $NH_2COCONH_2$ (oxamide), a curing and gas-forming agent 10 pbw $MgCO_3$ or dolomite, a filler and a gas-forming agent 3 pbw glycerol, an acceptor of moisture The mixture is cured under the effect of atmospheric moisture.

EXAMPLE 8

A complex three-pack curable mixture intended mainly for thermal insulation, watertight surface insulation and atmospheric attack-resistant insulation with a high surface smoothness, a complicated shape and dimensional precision, consisting of:

Pack I 100 pbw of a polyurethane prepolymer (just like in Ex. 6) containing about 8% free NCO groups, solidifying during copolymerisation with mercaptothiopolymer or during hydrolysis and forming a coating layer with a low heat conductivity.

10 pbw of a polysulfide polymer, LP 32C in this example 30 pbw of ammonium feroixalate, a crystalline hydrate, an easily water-soluble curing agent for the polysulfide polymer as well as a gas-forming filler.

This mixture is applied as the first layer of the coating, the components being preliminary dried and homogenized under vacuum.

Pack II

The mixture is an aqueous desaggregated suspension consisting of components capable to decompose under a heating at temperatures from 50° to 500° C. as well as to absorb the $CO_2$ evolved during the hardening of the polyurethane from Pack I, and forming the corresponding carbonates which also decompose at 50°–500° C., the said mixture consisting of:

10 pbw of water, which is a dispersing agent for $Zn(OH)_2$ and $Mg(OH)_2$, a hydrolysing agent for the polyurethane, and a polar solvent for the curing agents.

5 pbw of $Zn(OH)_2$, which is an acceptor of $CO_2$ and a curing agent for the polysulfide from Pack III 5 pbw $Mg(OH)_2$, an acceptor of $CO_2$ 1 pbw of $NH_4OH$, an acceptor of $CO_2$ and curing agent for the polysulfide from Pack III.

The mixture from Pack II is applied as a second layer of the coating.

Pack III 100 pbw of a polysulfide copolymer (same as in Ex.1)

10 pbw of zinc oxide, an acceptor of sulfur and filler 10 pbw of asbestos powder, a filler retarding burning 10 pbw $ZnC_2O_4 \cdot 2H_2O$, a gas-forming filler decomposing at 100° C.

15 pbw of water, a structure forming reagent during the curing of the polysulfide copolymer, a polar solvent of the CA from the second layer.

The mixture from Pack III is applied as the third layer of the complex coating. Preliminary curing of the third layer with $NH_3$ and subsequent sticking it to the first two layers is possible in cases when exact dimensions, a complex shape and a smooth surface are required.

EXAMPLE 9

A one-pack compostion to be cured at elevated temperature ranging from 150° to 200° C., the said composition consisting of:

100 pbw Thiokol ST with an average molecular weight of 40 000, an average sulfur rank above 2.25 and cross-linking 0%

5 pbw Thiokol LP 32C with blocked SH groups as a plasticizer, a curable polysulfide polymer.

5 pbw of zinc stearate (or nickel stearate or copper stearate) as a lubricating agent, a curable agent and a structure forming agent which saturates the valencies at the polysulfide bridges that have been liberated during the curing with stearate radicals, and decreases the volumetric expansion of the cured composition, respectively, when it is placed in solvents.

3 pbw of zinc oxide, an acceptor of sulphur and a during agent.

5 pbw of $Sn(C_3H_7)_4$, a liquid with a boiling point of 228° C., a dispersing agent of zinc oxide, a curing agent and a structure forming agent.

3 pbw of a polysulfide monomer (according to the given formula), a modifying agent.

50 pbw lamp blask, a filler, a support of adsorbed gaseous curing agent. The composition is prepared and cured in known manner.

EXAMPLE 10

A one-pack composition to be cured at 150°–200° C., which consists of:

100 pbw of Thiokol FA (average molecular weight of about 200 000)

5 pbw Thiokol LP 541 with blocked SH groups 5 pbw of zinc stearate 3 pbw of zinc oxide 5 pbw of $(C_2H_2)_3SnSn(C_2H_5)_3$, a liquid with a decomposition temperature of 270° C.

3 pbw of a polysulfide monomer, a modifier 50 pbw lamp black and up to 10 pbw of other known fillers and special-purpose additives.

The composition is prepared and cured in known manner.

REFERENCES

1. U.S. Pat. No. 3,225,017
2. U.S. Pat. No. 3,951,898
3. U.S. Pat. No. 4,608,433

We claim:
1. A curable polysulfide composition comprising a polysulfide polymer or copolymer, a curing agent, fillers, plasticizers and other special-purpose additives, the said composition containing at least one polysulfide polymer or polysulfide copolymer having a sulfur rank of 2.20 to 4.00, a SH- and SSH- groups content from 0 to 4 mol %, a polymerization degree of 10 to 500, wherein said polysulfide polymer or polysulfide copolymer is present in an amount of 90 to 110 pbw of the composition having the formula

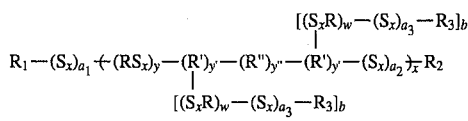

wherein $S_x$ represents a divalent polysulfide or monosulfide radical;

x is an integer ranging from 1 to 6;

$a_1$, $a_2$ and $a_3$ are the same different and have values from 0 to 1;

y has values from 1 to 10;

y' has a value from 0 to 1;

y" has a value from 0 to 5;

z has a value from 10 to 500;

w has a value from 0 to 5;

b has a value equal to the degree of polyvalency of R' minus 2

R is a divalent radical selected from the group consisting of: $-C_nH_{2n}-$; $-C_6H_4-$; $-C_nH_{2n}OC_nH_{2n}-$; $-C_nH_{2n}SC_nH_{2n}-$; $-C_nH_{2n}C_6H_4C_nH_{2n}$; $-C_6H_4OC_6H_4-$; $-C_6H_4OC_nH_{2n}-$; $-C_nH_{2n}C_6H_4OC_6H_4C_nH_{2n}-$; $-C_6H_4O(C_mH_{2m}O)_fC_6H_4-$; $-C_6H_4C_nH_{2n}OC_nH_{2n}C_6H_4-$; $-C_nH_{2n}O(C_mH_{2m}O)_fC_nH_{2n}-$; $-C_nH_{2n}OC_6H_4OC_nH_{2n}-$;

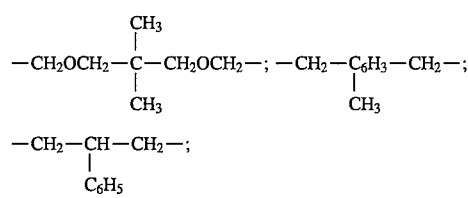

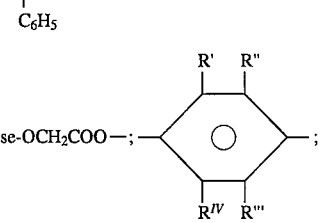

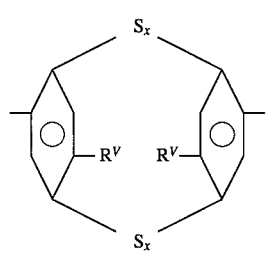

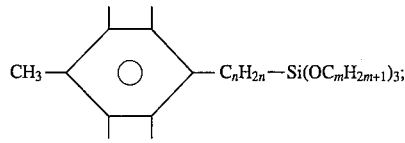

wherein n ranges from 1 to 24;

m ranges from 1 to 5;

f ranges from 1 to 10;

R', R", R''' and $R^{IV}$ are the same or different saturated monovalent, hydrocarbon, oxahydrocarbon or thiahydrocarbon radical $R^V$ is a saturated monovalent alkyl radical of the kind $-SC_mH_{2m+1}$ or $-OC_mH_{2m+1}-$;

$S_x$ is a polysulfide linkage;

x ranges from 3 to 5;

$R_1$, $R_2$ and $R_3$ are the same or different terminals representing normal or isoalkyl, aryl or aralkyl radicals or groups of the type: $-SH$; $-S-Na^+$; $-SSH$; $-OH$; $-CHO$; $-C_nH_{2n+1}$; $-C_nH_{2n}C_6H_5$; $-C_6H_4OC_6H_5$; $-C_nH_{2n}OC_6H_5$; $-C_nH_{2n}OC_nH_{2n+1}$; $-C_6H_5$; $-C_{10}H_7$; $-C_6H_4SC_6H_5$; $-OC_nH_{2n+1}$; $-OC_6H_5$; $-OC_7H_{10}$; $-OC_6H_4OC_nH_{2n+1}$; $-C_nH_{2n}OH$; $-C_6H_4OH$; $-OC_6H_4C_6H_4OH$; $-OC_nH_{2n}OH$; $-O(C_nH_{2n})_m-NHC_6H_5$;

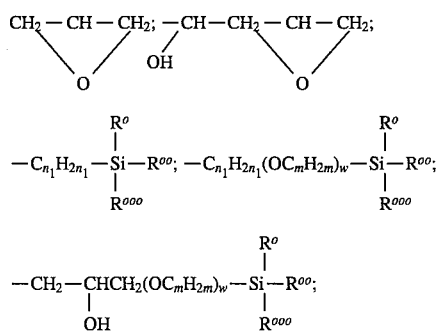

wherein $R^o$, $R^{oo}$ and $R^{ooo}$ are the same or different monovalent radicals of the group: $-OC_mH_{2m+1}$; $-OC_mH_{2m}C_6H_5$ or $-C_mH_{2m+1}$;

$n_1$ has values from 1 to 10;

m has values from 1 to 5;

w has values from 1 to 10;

R' is a polyvalent radical with a weight up to 10% of the molecular weight of the said polymer or copolymer and is a radical of a polyfunctional compound selected from the group;

XR $X_2$; $XCH_2CHXR_{II}CHXCH_2X$; R $CX_3$; $R_{IV}X_4$;

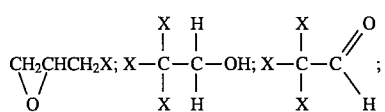

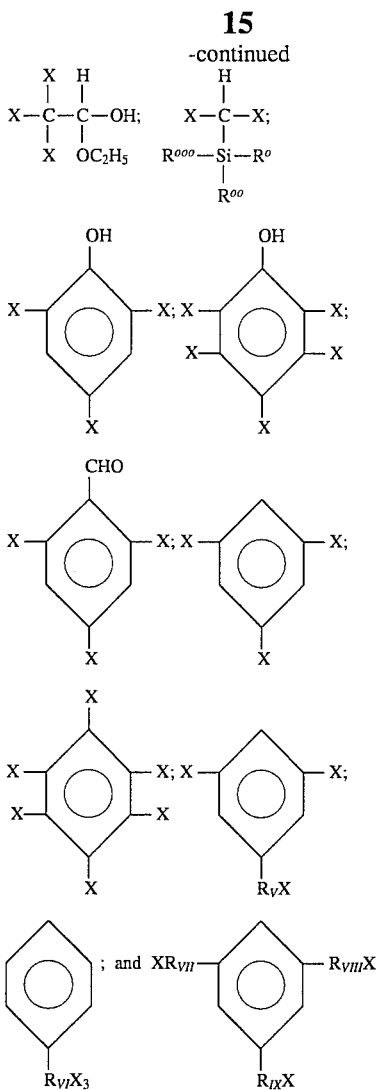

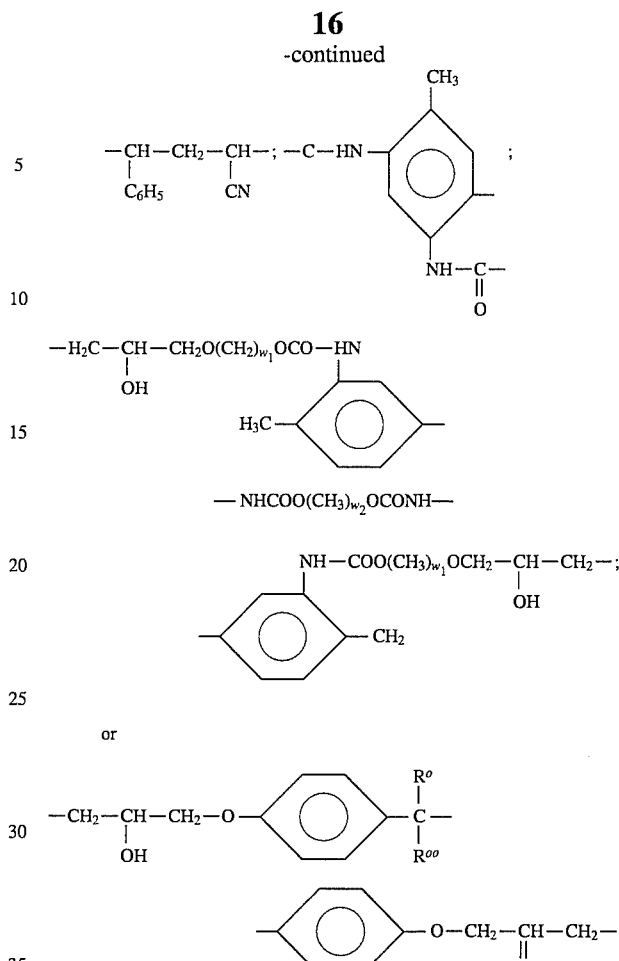

wherein x is a halogen atom $R_I$, $R_{II}$ and $R_{III}$ are hydrocarbon, oxahydrocarbon, thiahydrocarbon or aralkyl radicals;

$R_{IV}$ is selected from the group consisting of alkyl, aryl, aralkyl radicals or is a carbon atom;

$R_V$, $R_{VI}$, $R_{VII}$, $R_{VIII}$ and $R_{IX}$ are alkyl radicals representing a hydrocarbon or oxahydrocarbon;

$R^o$, $R^{oo}$ and $R^{ooo}$ are the same or different monovalent radicals of the group: —$OC_mH_{2m+1}$; —$C_nH_{2n}C_6H_5$; or —$OC_6H_5$, R" represents a divalent radical free of SH, SSH and $S_x$ groups and is selected from the group:

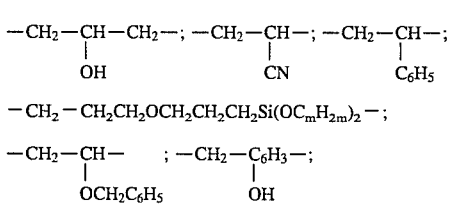

wherein m has values from 1 to 5;

$w_1$ has values from 4 to 6;

$w_2$ has values from 4 to 6;

$R^o$ and $R^{oo}$ are the same or different having the corresponding meaning of $R^o$, $R^{oo}$, $R^{ooo}$ included in R, or they are hydrogen atoms or alkyl radicals and the said composition comprises as well:

a modifier of 3 to 75 pbw of the composition wherein the modifier polymerizes, copolymerizes or cocures with the basic polysulfide polymer or copolymer and wherein the modifier is a polysulfide polymer free of —SH and —SSH groups, the said polymer having an average molecular weight of up to 2000, a degree of polymerization of 2 to 10, a sulphur rank of 2.5 to 5 and the formula

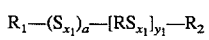

wherein $s_{x_1}$ is a polysulfide linkage $x_1$ has values ranging from 2 to 6;

$y_1$ has values from 3 to 10;

a is from 0 to 1; and

R, $R_1$ and $R_2$ are as defined above excepting —SH and —SSH;

a curing agent of 0.2 to 20 pbw of the composition;

a polar reagent and/or solvent of 10 to 25 pbw of the composition;

an acceptor of 5 to 50 pbw of the composition; and fillers and other additives of up to 150 pbw.

2. A composition according to claim 1 in which the curing agent interacts and/or dissolves at the curing temperature in the polar reagent or polar solvent in liquid or gaseous form and in which the curing agent is selected from the group consisting of: gaseous substances; ammonium hydroxide; hydroxylamine, hydrazine; organo-hydrazines; ammonium and metal monosulfides; metal powders, oxides, hydroxides, carbonates and basic salts; complex hydroxides; carbonates and oxalates; ammonium and metal salts of metal acids (double oxides); metal pyrophosphates; complex metal cyanides; alkali catholytes; metal alcoholates, polyalcoholates and polymeric alcoholates; metal mercaptides and polymercaptides; salts of mono, di and tricarboxylic acids and their derivatives; polymeric caarboxylates; metallio-organic hydrocarbons including naphthenates and octoates, phosphonates, thiophosphonates, borates, boranes, sulphonamides etc; metal amides; organic amides and amines; organic aldehydes; alkalized chloroparaffins, chloropolyphenyls; unsaturated low-molecular weight compoounds; or the said curing agent is stable in the used polar solvent and is a metal powder, oxide, hydroxide, oxahydroxide or salt whose metal has higher chemical affinity towards oxygen or the exchangeable anion, or the said curing agent is an ionic melt or a metal containing polar liquid or is a combination of two or more of them.

3. A composition as set forth in claim 1 wherein the polar reagent or polar solvent of the curing agent is in liquid or gaseous form at the curing temperature.

4. A composition according to claim 1 wherein the acceptor is an acceptor of gaseous polar reagent or solvent and is an organic liquid infinitely soluble in the said solvent or is a strongly hygroscopic potential curing agent.

5. A composition according to claim 1 wherein the acceptor forms a solid-phase metal-containing compound which is stable in the used polar solvent and is an acceptor of sulphur or an acceptor of CO, or an acceptor of acidic anions, or an acceptor of excess of alkalinity.

6. A composition according to claim 1 wherein the gas-forming filler decomposes at temperatures of from 50° to 500° C. and is a crystalline hydrate of a complex ammonium hydroxide, carbonate or oxalate, while the active filler contains an absorbed, adsorbed, activated or ionized curing agent.

7. A composition according to claim 1 in which the special purpose additive is an inhibitor of curing and represents a chemical compound binding the active atoms or ions of the curing agent to moderately or weakly active atoms and/or ions and a polyol, carboxylic acid, boric acid, or mixtures thereof.

8. A method of curing the composition defined in claim 1 at ambient temperature, by which a one-pack composition deposited in the corresponding place is cured by surface contact with a gaseous liquid or dissolved curing agent or a gaseous or liquid polar solvent or their mixtures, while a two- or three-pack composition is cured by layer-by-layer application.

9. A curable polysulfide composition comprising a polysulfide polymer or copolymer, a curing agent, fillers, plasticizers and other special-purpose additives, the said composition containing at least one polysulfide polymer or polysulfide copolymer having a sulfur rank of 2.20 to 4.00, a SH- and SSH- groups content from 0 to 4 mol %, a polymerization degree of 10 to 500, wherein said polysulfide polymer or polysulfide copolymer is present in an amount of 90 to 110 pbw of the composition having the formula

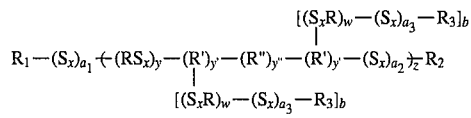

wherein $S_x$ represents a divalent polysulfide or monosulfide radical;

x is an integer ranging from 1 to 6;

$a_1$, $a_2$ and $a_3$ are the same or different and have values from 0 to 1;

y has values from 1 to 10;

y' has a value from 0 to 1;

y" has a value from 0 to 5;

z has a value from 10 to 500;

w has a value from 0 to 5;

b has a value equal to the degree of polyvalency of R' minus 2;

R is a divalent radical selected from the group consisting of: $-C_nH_{2n}-$; $-C_6H_4-$; $-C_nH_{2n}OC_nH_{2n}-$; $-C_nH_{2n}SC_nH_{2n}-$; $-C_nH_{2n}C_6H_4C_nH_{2n}$; $-C_6H_4OC_6H_4-$; $-C_6H_4OC_nH_{2n}$; $-C_nH_{2n}C_6H_4OC_6H_4C_nH_{2n}-$; $-C_6H_4O(C_mH_{2m}O)_fC_6H_4-$; $-C_6H_4C_nH_{2n}OC_nH_{2n}C_6H_4-$; $-C_nH_{2n}O(C_mH_{2m}O)_fC_nH_{2n}-$; $-C_nH_{2n}OC_6H_4OC_nH_{2n}-$;

$$-CH_2OCH_2\underset{\underset{CH_3}{|}}{\overset{\overset{CH_3}{|}}{C}}-CH_2OCH_2-;\quad -CH_2-\underset{\underset{CH_3}{|}}{C_6H_3}-CH_2-;$$

$$-CH_2-\underset{\underset{C_6H_5}{|}}{CH}-CH_2-$$

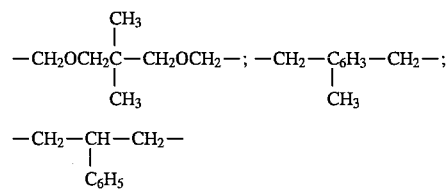

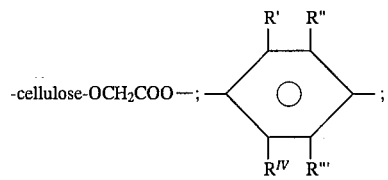

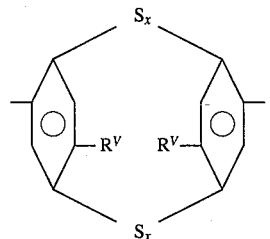

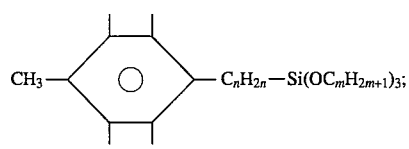

wherein n ranges from 1 to 24;

m ranges from 1 to 5;

f ranges from 1 to 10;

R', R", R''' and $R^{IV}$ are the same or different saturated monovalent hydrocarbon, oxahydrocarbon or thiahydrocarbon radical;

$R^V$ is a saturated monovalent alkyl radical of the kind $-SC_mH_{2m+1}$ or $-OC_mH_{2m+1}-$;

$S_x$ is a polysulfide linkage;

x ranges from 3 to 5, $R_1$, $R_2$ and $R_3$ are the same or different terminals representing normal or isoalkyl, aryl or aralkyl radicals or groups of the type: $-SH$; $-S-Na^+$; $-SSH$; $-OH$; $-CHO$; $-C_nH_{2n+1}$; $-C_nH_{2n}C_6H_5$; $-C_6H_4OC_6H_5$; $-C_nH_{2n}OC_6H_5$; $-C_nH_{2n}OC_nH_{2n+1}$; $-C_6H_5$; $-C_{10}H_7$; $-C_6H_4SC_6H_5$; $-OC_nH_{2n+1}$; $-OC_6H_5$; $-OC_7H_{10}$; $-OC_6H_4OC_nH_{2n+1}$; $-C_nH_{2n}OH$; $-C_6H_4OH$; $-OC_6H_4C_6H_4OH$; $-OC_nH_{2n}OH$; $-O(C_nH_{2n})m-NHC_6H_5$;

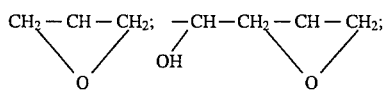

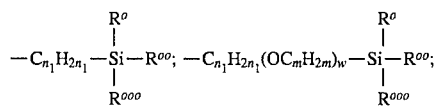

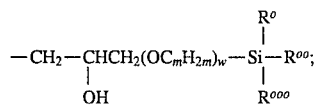

wherein $R^o$, $R^{oo}$ and $R^{ooo}$ are the same or different monovalent radicals of the group: $-OC_mH_{2m+1}$; $-OC_mH_{2m}C_6H_5$ or $-C_mH_{2m+1}$;

$n_1$ has values from 1 to 10;

m has values from 1 to 5;

w has values from 1 to 10;

R' is a polyvalent radical with a weight up to 10% of the molecular weight of the said polymer or copolymer and is a radical of a polyfunctional compound selected from the group;

$XR\ X_2$; $XCH_2CHXR_{II}CHXCH_2X$; $R\ CX_3$; $R_{IV}X_4$;

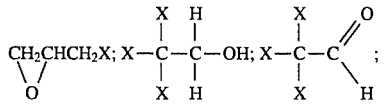

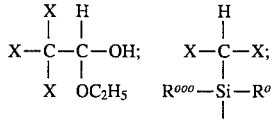

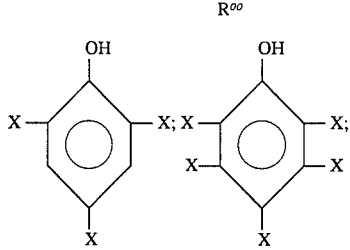

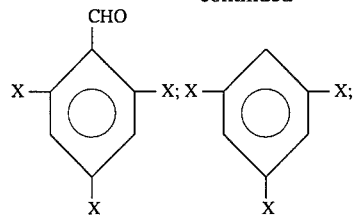

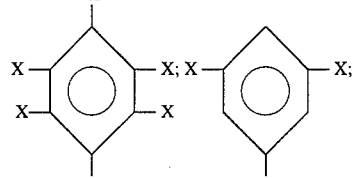

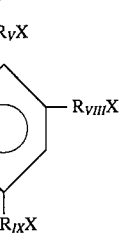

wherein x is a halogen atom;

$R_I$, $R_{II}$ and $R_{III}$ are hydrocarbon, oxahydrocarbon, thiahydrocarbon or aralkyl radicals;

$R_{IV}$ is selected from the group consisting of alkyl, aryl, aralkyl radicals or is a carbon atom;

$R_V$, $R_{VI}$, $R_{VII}$, $R_{VIII}$ and $R_{IX}$ are alkyl radicals representing a hydrocarbon or oxahydrocarbon;

$R^o$, $R^{oo}$ and $R^{ooo}$ are the same or different monovalent radicals of the group: $-OC_mH_{2m+1}$; $-C_nH_{2n}C_6H_5$; $-OC_6H_5$, wherein "m" ranges from 1 to 5 and, "n" ranges from 1 to 10;

R" represents a divalent radical free of SH, SSH and $S_x$ groups and is selected from the group:

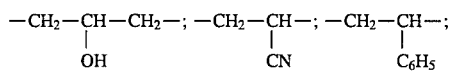

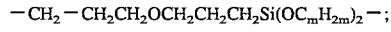

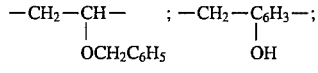

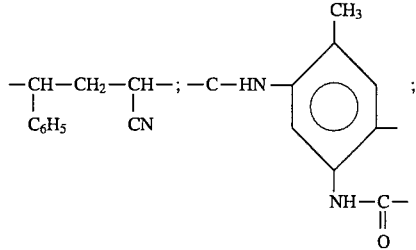

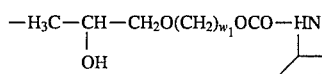

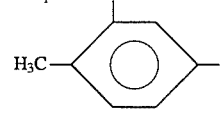

-continued $-NHCOO(CH_2)_{w_2}OCONH-$

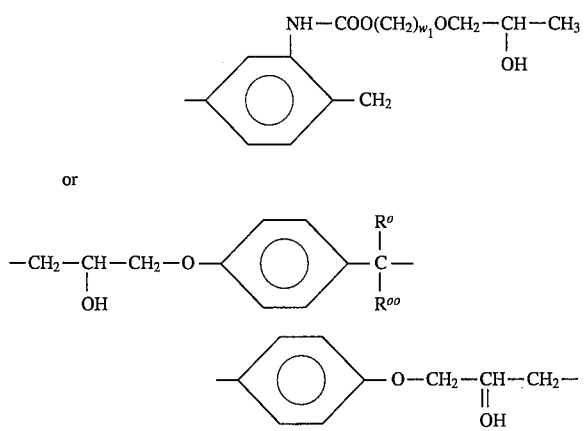

or

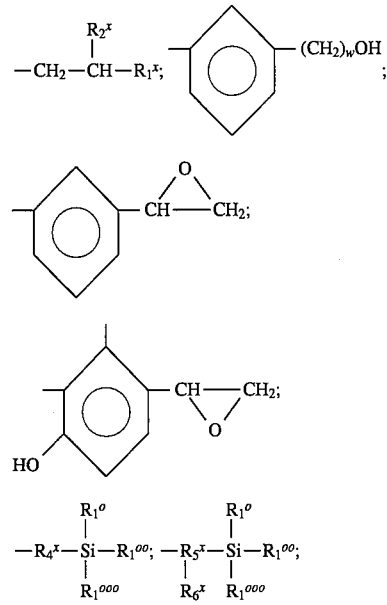

wherein
m has values from 1 to 5;
$w_1$ has values from 4 to 6;
$w_2$ has values from 4 to 6;
$R^o$ and $R^{oo}$ are the same or different having the corresponding meaning of $R^o$, $R^{oo}$, $R^{ooo}$ included in R, or they are hydrogen atoms or alkyl radicals and the said composition comprises as well:
a modifier of 3 to 75 pbw of the composition wherein the modifier polymerizes, copolymerizes or cocures with the basic polysulfide polymer or copolymer and wherein the modifier is a bis-polysulfide dimer with a formula of the type

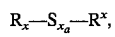

wherein
$S_{x_a}$ is a polysulfide bond;
$x_a$ is an integer from 3 to 6;
$R_x$ is a monovalent radical free of —SH and —SSH groups and is selected from the group consisting of:

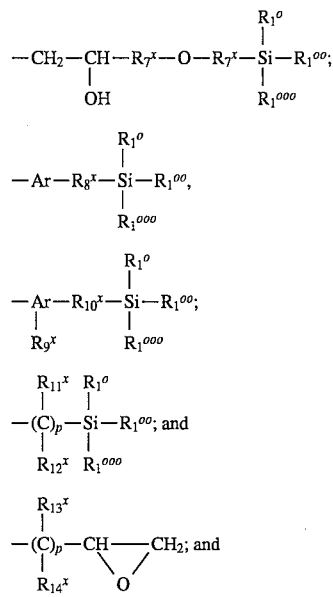

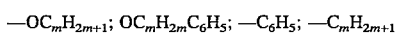

wherein
$R^x_1$ to $R^x_{14}$ denote alkyl or aralkyl radicals containing from 1 to 15 carbon atoms;
$R^o$, $R^{oo}$ and $R^{ooo}$ are the same or different saturated monovalent radicals of the kind $-OC_mH_{2m+1}$; $OC_mH_{2m}C_6H_5$; $-C_6H_5$; $-C_mH_{2m+1}$ wherein
m has values from 1 to 5;
w has values of 1 to 5;
p has values of 1 to 5; and
Ar is an aryl radical;
a curing agent of 0.2 to 20 pbw of the composition; and
a polar reagent or solvent of 10 to 25 pbw of the composition;
an acceptor of 5 to 50 pbw of the composition; and
fillers and other additives of up to 150 pbw of the composition.

10. A composition according to claim 9 in which the curing agent interacts and/or dissolves at the curing temperature in the polar reagent or polar solvent in liquid or gaseous form and in which the curing agent is selected from the group consisting of: gaseous substances; ammonium hydroxide; hydroxylamine, hydrazine; organo-hydrazines; ammonium and metal monosulfides; metal powders, oxides, hydroxides, carbonates and basic salts; complex hydroxides; carbonates and oxalates; ammonium and metal salts of metal acids (double oxides); metal pyrophosphates; complex metal cyanides; alkali catholytes; metal alcoholates, polyalcoholates and polymeric alcoholates; metal mercaptides and polymercaptides; salts of mono, di and tricarboxylic acids and their derivatives; polymeric caarboxylates; metallio-organic hydrocarbons including naphthenates and octoates, phosphonates, thiophosphonates, borates, boranes, sulphonamides; metal amides; organic amides and amines; organic aldehydes; alkalized chloroparaffins, chloropolyphenyls; unsaturated low-molecular weight compounds; or the said curing agent is stable in the used polar solvent and is a metal powder, oxide, hydroxide, oxahydroxide or salt whose metal has higher chemical affinity towards oxygen or the exchangeable anion, or the said curing agent is an ionic melt or a metal containing polar liquid or is a combination of two or more of them.

11. A composition as set forth in claim 9 wherein the polar reagent and/or polar solvent of the curing agent is in liquid or gaseous form at the curing temperature.

12. A composition according to claim 9 wherein the acceptor is an acceptor of gaseous polar reagent and/or solvent and is an organic liquid infinitely soluble in the said solvent or is a strongly hygroscopic potential curing agent.

13. A composition according to claim 9 wherein the acceptor forms a solid-phase metal-containing compound which is stable in the used polar solvent and is an acceptor of sulphur or an acceptor of CO, or an acceptor of acidic anions, or an acceptor of excess of alkalinity.

14. A composition according to claim 9 wherein the gas-forming filler decomposes at temperatures of from 50° to 500° C. and is a crystalline hydrate of a complex ammonium hydroxide, carbonate or oxalate, while the active filler contains an absorbed, adsorbed, activated or ionized curing agent.

15. A composition according to claim 9 in which the special purpose additive is an inhibitor of curing and represents a chemical compound binding the active atoms or ions of the curing agent to moderately or weakly active atoms and/or ions and is a polyol, carboxylic acid, boric acid, their derivatives or mixtures thereof.

16. A method of curing the composition defined in claim 9 at ambient temperature by which a one-pack composition deposited in the corresponding place is cured by surface contact with a gaseous liquid or dissolved curing agent or a gaseous or liquid polar solvent or their mixtures, while a two- or three-pack composition is cured by layer-by-layer application.

* * * * *